United States Patent

Firdaus

[19]

[11] Patent Number: 5,819,514
[45] Date of Patent: Oct. 13, 1998

[54] PIVOTING WHEEL INTERLOCK

[75] Inventor: Usman Firdaus, Strongsville, Ohio

[73] Assignee: MTD Products Inc, Cleveland, Ohio

[21] Appl. No.: 682,182

[22] Filed: Jul. 7, 1996

[51] Int. Cl.⁶ .................................................. A01D 34/68
[52] U.S. Cl. ............................ 56/16.7; 56/210; 16/35 R
[58] Field of Search .................... 56/12.8, 16.7, 56/17.2, 210, DIG. 3, DIG. 10; 16/35 R; 280/47.34

[56] References Cited

U.S. PATENT DOCUMENTS

| | | | |
|---|---|---|---|
| 2,544,924 | 3/1951 | Herold | 16/35 R X |
| 2,848,859 | 8/1958 | Abel | 56/17.2 |
| 2,857,725 | 10/1958 | Canfield | 56/17.2 X |
| 4,037,291 | 7/1977 | Huempfner et al. | 16/35 R |
| 4,942,726 | 7/1990 | Bowditch | 56/17.2 |
| 5,187,926 | 2/1993 | Rhoads | 56/17.2 X |

FOREIGN PATENT DOCUMENTS

| | | | |
|---|---|---|---|
| 219013 | 11/1958 | Australia | 280/47.34 |
| 0367891 | 5/1990 | European Pat. Off. . | |
| 3718443 | 12/1988 | Germany | 16/35 R |
| 9003696 | 8/1990 | Germany . | |

*Primary Examiner*—John A. Ricci
*Attorney, Agent, or Firm*—Emerson & Associates; Roger D. Emerson; John M. Skeriotis

[57] ABSTRACT

In a lawn and garden device having a fixed rear axle and a pivoting front wheel, the improvement of an interlock so as to prevent the pivoting of the front wheel in respect to the frame of the device.

12 Claims, 4 Drawing Sheets

PIVOTING WHEEL INTERLOCK

FIELD OF THE INVENTION

This invention relates to a pivoting wheel interlock for lawn and garden care equipment, and more particularly to a walk behind lawn vacuum.

BACKGROUND OF THE INVENTION

Lawn and garden care equipment having pivoted wheels has been used for many years. Examples include lawn vacuums, lawn blowers, front deck lawnmowers, and the like. Typically these devices have two wheels which are fixedly connected to the frame for rotation in respect thereto and either one or two pivoting wheels at the other end of the device, which pivoting wheels allow the device to be steered in the operators' direction of choice without having to lift any wheel off the ground in order to accomplish such turn. These devices are functional in that they relieve the operator of the necessity of having to balance the weight of the device on two side by side wheels while at the same time allowing for the relatively unencumbered steering of the device. Most of the time, these devices function as they were designed to. However under certain circumstances the very feature which makes them most convenient, the pivoting wheel, can create complications. An example of this is when an operator is attempting to use a device across the width of a hill—a circumstance under which the device will tend to float downwards through the path of least resistance. Under this condition, the operator has to use a continually fatiguing compensating force on the handlebars in order to keep the device going in a straight direction. This is not desirable.

OBJECTS AND SUMMARY OF THE INVENTION

It is an object of the present invention to provide for a adaptable pivoting wheel device.

It is an object of the present invention to simplify the construction of devices including pivoting front wheels.

It is an object of the present invention to allow for the selective retention of a pivoting wheel in a set angular location in respect to a lawn and garden care device.

It is still an object of the present invention to simplify the construction of adaptable devices including pivoting wheels.

It is a further of the present invention to increase the adaptability of devices including pivoting wheels.

It is still a further object of the present invention to allow for the selective compensation of a pivoting wheel in order to adapt the device to certain situations.

Other objects that are a more complete understanding of the invention may be had by referring to the drawings.

BRIEF DESCRIPTION OF THE DRAWINGS

The structure, operation, and advantages of the present preferred embodiment of the invention will become further apparent upon consideration of the following description taken in conjunction with the accompanying drawings wherein.

DETAILED DESCRIPTION OF THE INVENTION

Figure 4:
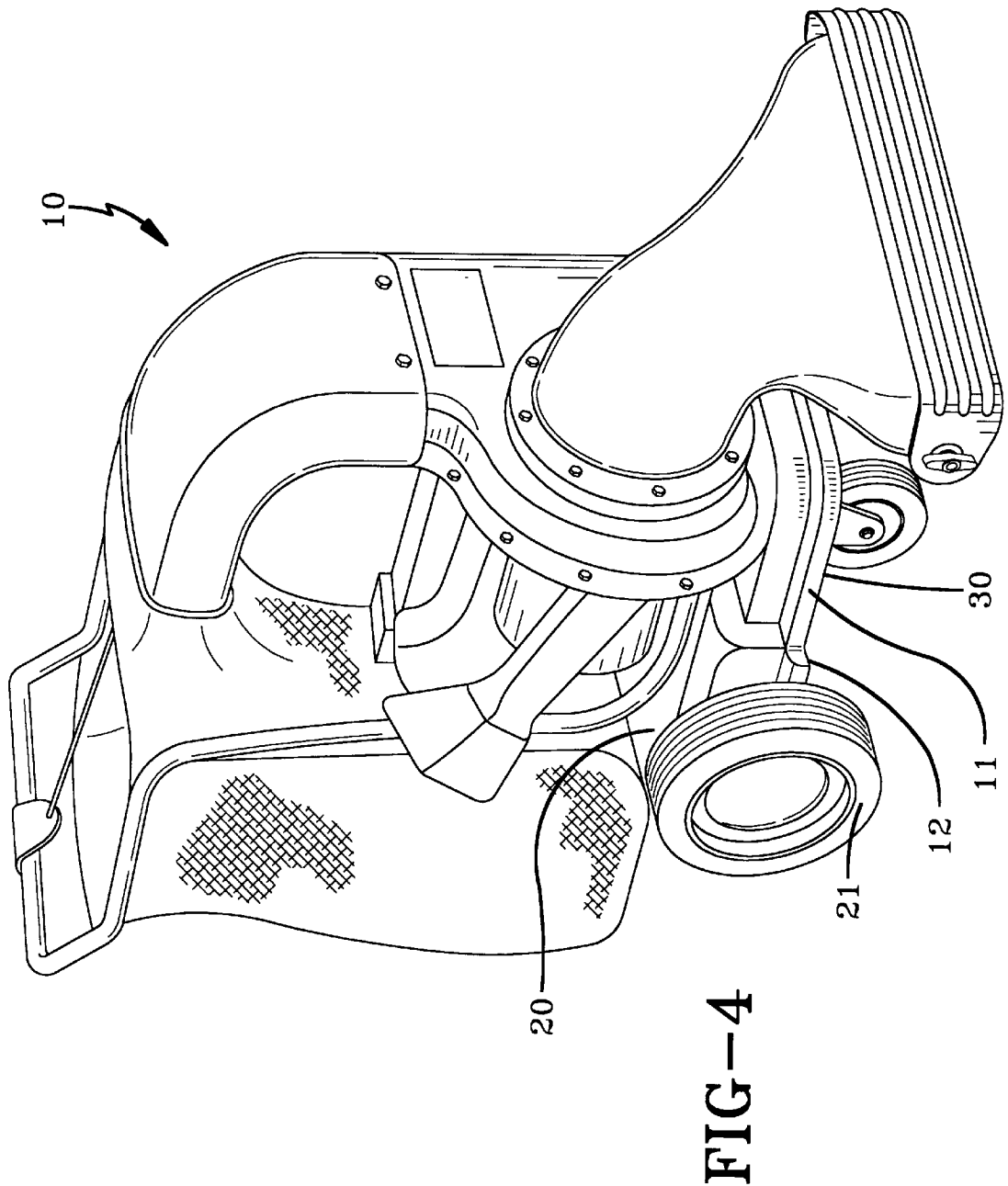
FIG. 4 is a view of a device incorporating the invention.

The interlock of this present invention is designed to be used with a lawn and care device 10. This device 10 includes a frame 11, a rear axle assembly 20, and a front axle assembly 30 (FIG. 4). Any sort of lawn and garden care device could use the invention.

The frame 11 of the device 10 is designed to support the associated parts of the device. These parts will vary as to the particular device in question. For clarity, the device will be described in a preferred embodiment of a modification to a lawn vacuum such as the MTD Model 685 lawn vacuum. For this particular device, the frame 11 would support the handlebars, an engine and a blower assembly together with the various clutches and controls needed to operate this lawn vacuum. For clarity of presentation, these items are shown in the FIG. 4.

The invention begins with a set of axle assemblies, at least one of which includes a wheel which is pivoted to the frame 11 so as to allow the angular displacement of such wheel in respect to the frame. While the positioning of these wheels may differ depending on the particular device, the operation of the invention will be described with the pivoting wheel being located on the front of the frame of the device as shown in the preferred embodiment herein.

The particular frame 11 of the preferred embodiment disclosed is supported for travel over the ground by a rear axle assembly 20 and a front wheel assembly 30.

The rear axle assembly 20 includes two back drive wheels 21 which extend off either side of the half section 12 of the frame 11. These two wheels 21 are selectively interconnected through a clutch to the engine mounted on the frame in one of a variety of manners well known in the art. In the particular embodiment disclosed, this means is a variator mechanism. With manipulation of these controls and the engine speed, the direction, speed and braking condition of the wheels 21 are under the direct control of the operator.

As the rear wheels 21 in this embodiment are directly interconnected to the frame 11 by simple bearing assemblies, there is no pivoting motion of this rear assembly in respect to the frame 11.

Figure 1:
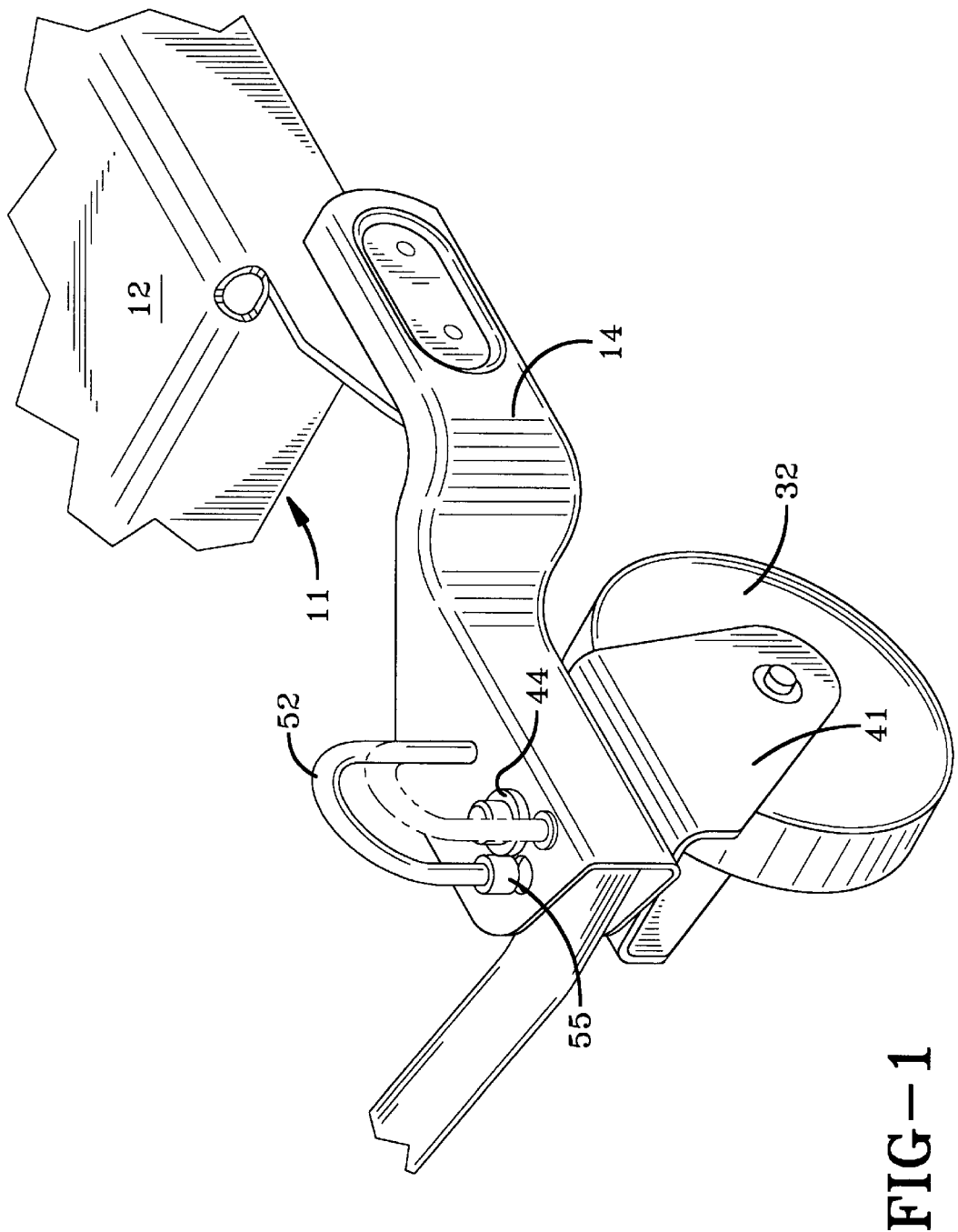
FIG. 1 is a perspective view of a front corner of a device incorporating the invention of the application.
Figure 2:
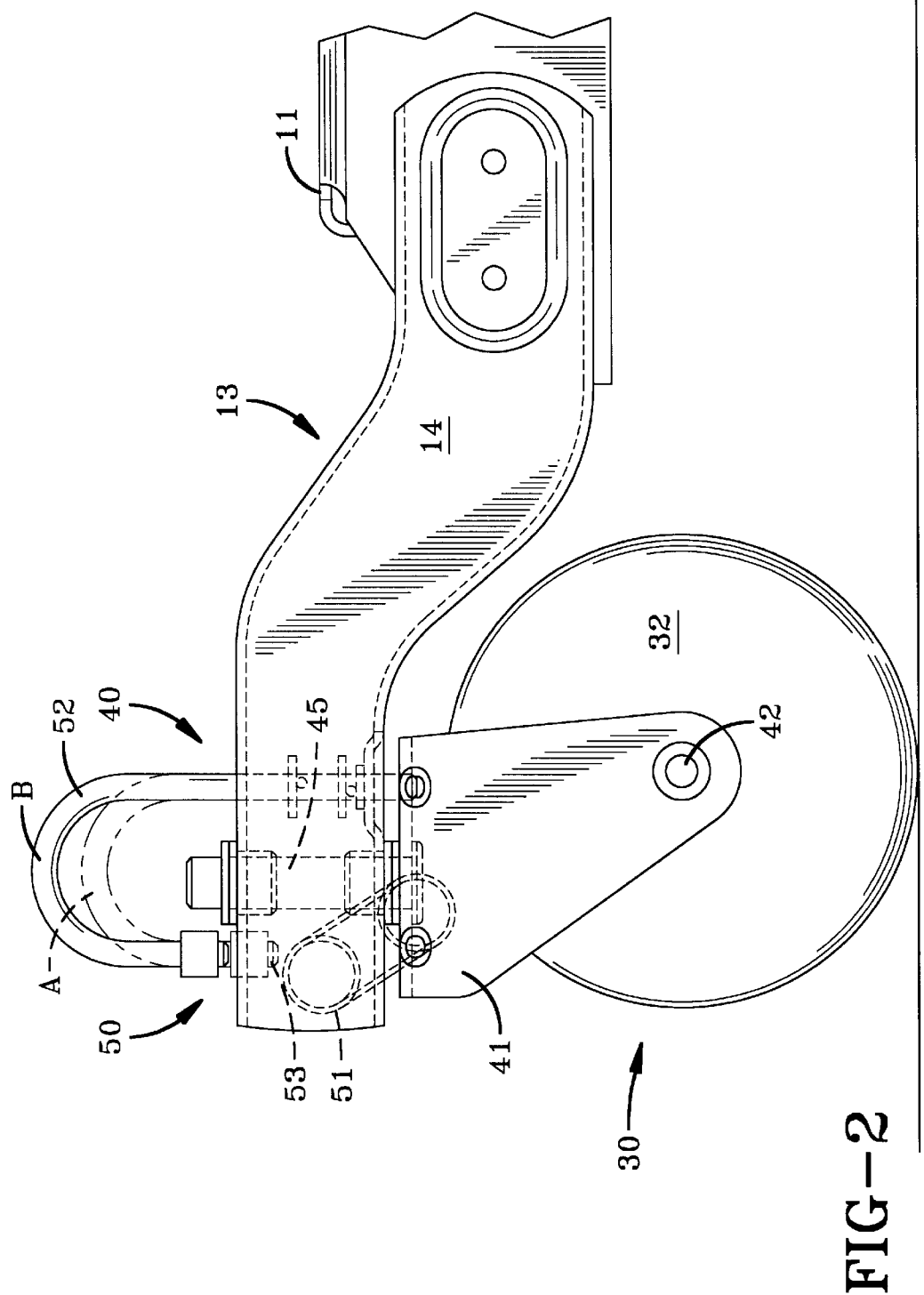
FIG. 2 is a sideward view of the pivoting wheel of FIG. 1.
Figure 3:
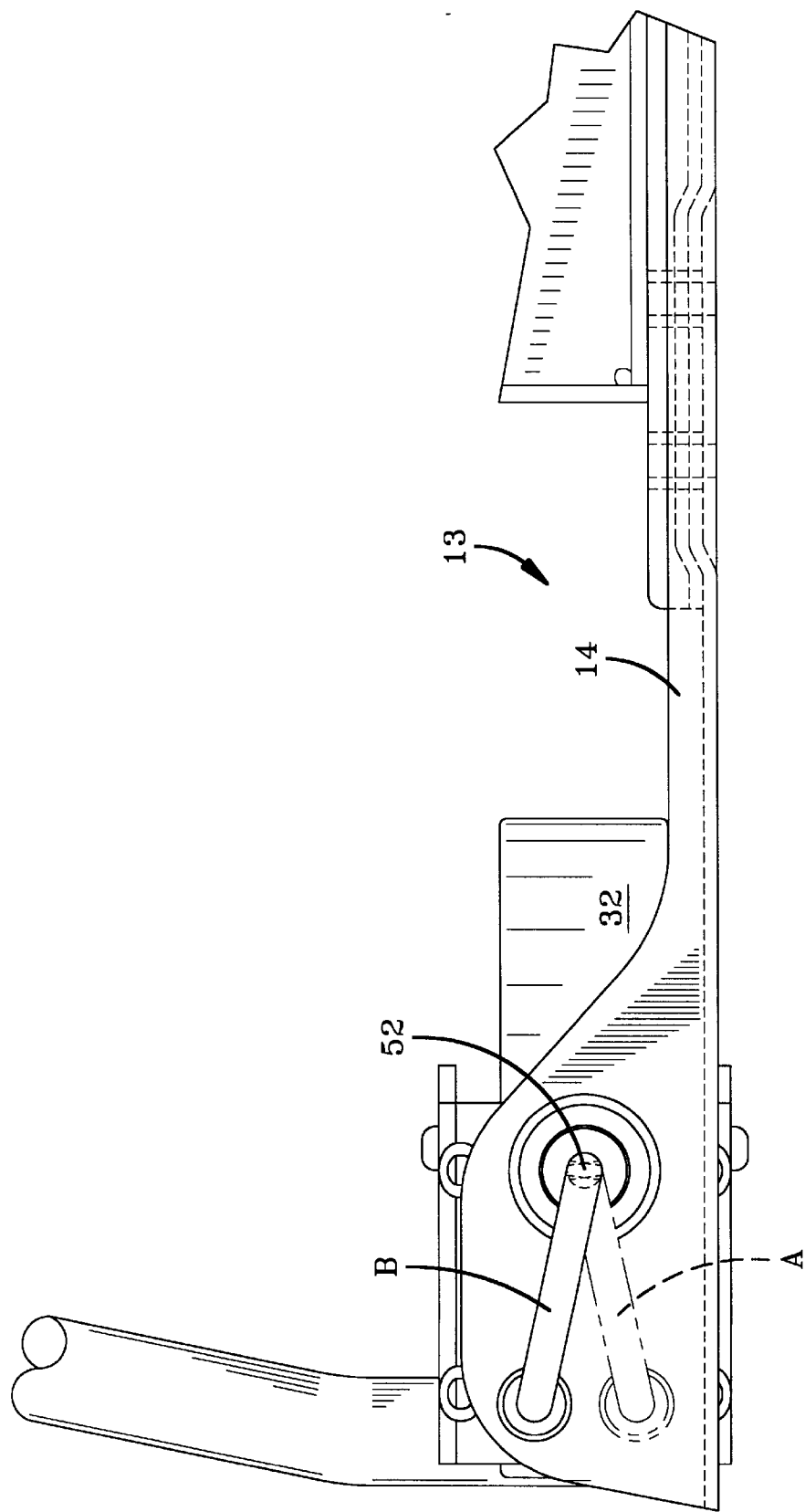
FIG. 3 is a downward view of the pivoting wheel of FIG. 1.

The front axle assembly 30 of the preferred embodiment disclosed includes two wheels 32 interconnected to the forward section 13 of the frame 11 by arms 14 respectively (FIGS. 1–3).

The wheels 32 are each interconnected to their respective arms by a forward, self-aligning pivot assembly 40.

Each pivot assembly 40 includes an intermediate axle support 41 located between the respective wheel and the respective arm 14 of the forward section 13 of the frame 11.

The axle support 41 includes a lower bearing 42 and an upwards extending pivot shaft 45.

The lower bearing 42 connects the wheel to the axle support 41 for free rotation in respect thereto. This bearing can be a sleeve, ball, roller or other type of bearing.

The pivot shaft 45 typically allows the 360° rotation of the axle support 41 in respect to the arms 14 of the forward section 13 of the frame 11. This action allows the front end of the device to be selectively moved in a direction chosen by the operator without significant resistance. The location of the axis of the pivot shaft 45 in front of the axis of the bearing 42 allows for the self-alignment of the wheel to the direction of movement of the device.

In the particular embodiment disclosed, the axis of the pivot shaft 45 is located off center in respect to the axis of the bearing 42, an orientation which allows the front wheels to automatically align themselves in respect to the direction of movement of the device 10 whether this direction movement be forward, angularly sidewards or rearwardly. Due to this orientation, the unit will not stall with the wheels sideways to resist any intended movement of the device.

In ordinary lawn and garden care equipment with freely pivotable wheels, such wheels tend to follow the contour of the ground. While typically this causes floating downwards in respect to the slope that the device is operated upon, it can also mean being knocked sideways by a bump or rut in the lawn or other surface. Further, with multiple pivoted front wheels, the movement may be in the same or differing direction and in similar or different amounts. In order to compensate for this floating, the operator of the device must place an unnatural uninstinctive force on the handlebars of the device to ensure that such device actually tracks across the terrain involved. This compensation causes an unnatural uninstinctive feel for the operator. In certain instances the compensating force can be extremely fatiguing, especially with a rather heavy device and a significant slope. Further the wandering of the device also reduces the overall efficiency of the operation of the device.

In the invention of the present application, it is possible to selectively lock at least one of the pivoting wheels for the device in order to ensure the accurate tracking of the device 10 across the particular terrain involved. The reason that the device accomplishes this is that, by locking the pivoting assembly 40 against any angular movement in respect to the frame 11, a device is produced which has at least two wheels, preferably longitudinally displaced, which are fixedly connected thereto. This type of interconnection provides a device which will tend to continue in a straight line unless physically manipulated by the operator so as to artificially cause an angular movement. Further, this angular movement can be created by a sliding one wheel across the ground sideways against respect to the friction which is produced thereby or by artificially lifting one wheel above the ground so as to allow its free movement angularly in respect to the direction of travel. These both require active operator intervention.

In the preferred particular embodiment disclosed, the pivoting wheel interlock is provided by the separate lock 50. This separate lock 50 is a mechanical piece which interconnects the axle support 41 to the arms of the frame 11 so as to solidly lock the otherwise pivoting wheel in a set position in respect to such frame.

The preferred lock itself is a substantially U-shaped lock piece 52 biased by a spring 51 into a downward position in respect to the arms 14 of the device. This lock piece 52 has two selective positions in respect to its arm.

In one selective position of the lock piece 52 in respect to the arm 14 (pos A in FIG. 3), a nubbin 53 selectively fits through an enlarged hole in the arm 14 to interengage a hole 44 in the upper surface of the axle support 41 so as to solidly interconnect the axle support 41 in fixed angular relationship in respect to the arm. The nubbin 53 thus ensures the solid interconnection between the lock piece 52 and the arm of the frame. (Note that the preferred embodiment disclosed has two front wheels 32. Either or both of these can be locked in an angular position.) The operation of the lock piece 52 is up to the operator. For example locking of one wheel allows some pivoting action of the other (suitable perhaps for movement across a flat surface with ruts) while the locking of both wheels allows none (suitable perhaps for movement sideways across a comparatively steep slope).

In a secondary position (pos B in FIG. 3), the nubbin 53 of the separate lock is interengaged by the spring force into a hole 55 on the arm 14 itself so as to retain the lock piece 52 out of engagement with the axle support 41. This position allows for the free pivoting motion of the axle support 41 in respect to the arm 14 of the frame 11.

In all instances, the spring 51 provides an engagement bias force for the lock piece 52 so as to ensure that, once selectively engaged, the lock does not inadvertently disengage so as to allow any unintended movement of the axle support 41 (and thus the wheels) in respect to the arms of the frame 11.

With the separate lock piece 52 engaged, the wheel(s) are held in position in respect to the frame 11 such that they, in combination with the rear wheels of the half section of the frame, allow for the continual movement of the frame 11 in a relative single direction in respect to the terrain. The reason for this is that since neither the otherwise pivoting wheel(s) on the forward section 13 or the wheels on the half section 12 can angularly pivot in respect to the frame 11, the frame 11 will continue along a certain set direction absent a significant manipulating force in respect thereto. An example of this significant manipulating force would be to lift one of the wheels of the forward section 13 or the half section 12 off of the ground so as to artificially manipulate the location of such wheel in respect to the others. However, in the absence of such artificial movement, the frame 11 will tend to continue on in a straight direction. For this reason, it is not necessary for the operator to either face the fatiguing continual compensating force necessary to keep a pivoting wheel device going in a single direction against contrary forces nor is it necessary for the operator to artificially manipulate the device in order to continue its operation in a single direction. Operation efficiency is also enhanced.

The difference between these two conditions of operation is caused by the engagement of the separate lock piece 52 with the axle support of the pivoting axle assembly. As previously discussed, this engagement is selective depending upon the operators manually overcoming the force of the spring 51 in order to selectively engage this lock.

Upon disengagement of the lock 50, the lawn and garden device will operate in a normal manner in that the pivoting wheels will allow for the selective angular displacement of the frame 11 while also returning to the main direction of movement in an intuitive manner without significant resistance. This nonlocked position would be suitable for operation of the lawn and garden device in a selective manner over a flat terrain and/or around numerous interfering objects such as trees, walls, walks and other impediments.

Note that if desired, the separate lock could be interengaged even on flat surfaces. This interengagement would allow for the lawn and garden device to continue in a preset direction without operator intervention, thus easing the control of the device over such surface. This will be particularly suitable in respect to large flat lawns wherein the constant steering corrections would be tiring and/or the operator desired more direct physical control over the device as opposed to allowing it to freely wander across the lawn. Further note that the separate lock can be remotely activated—for example by a boden wire to a hand control—so as to simplify changeover. This would be particularly appropriate to conditions that might rapidly change.

Therefor although the invention has been described in a certain degree of particularity, it is to be understood that numerous changes could be made without deviating the invention as hereinafter claimed.

What is claimed:

1. A lawn care appliance having a frame supported by two sets of wheels, a front and a rear set, the rear set being fixed to the frame and the front set being connected to the frame by a vertical pivot extending through two adjacent surfaces, a first surface connected to the frame and the second surface associated with the vertical pivot, the improvement comprising:

locking means to selectively lock the vertical pivot so as to prevent the pivoting of at least one front wheel in respect to the frame, said locking means having a first and second end, said first end having an axis of rotation, said second end selectively positionable in said first surface to engage or disengage said first end with said vertical pivot, said second having an axis, said axis of said first end and said axis of said second end being substantially parallel to one another, said locking further including a pin, said pin being movably connected to one of said first surface or said second surface, a hole, said hole being in the other of said first surface or said second surface, and said locking means including means to selectively engage said pin with said hole.

2. The lawn care appliance of claim 1 characterized by the addition of a spring and said spring biasing said pin in said hole.

3. The lawn care appliance of claim 1 characterized in that said pin has an axis and said axis of said pin being substantially parallel to the rotational axis of the vertical pivot.

4. The lawn care appliance claim 1 characterized by the addition of means to selectively position said pin out of engagement with said hole.

5. A lock piece for a lawn care appliance having a frame supported by two sets of wheels, a front and a rear set, the rear set being fixed to the frame and the front set being connected to the frame via vertical pivots, respectively each vertical pivot extending through two adjacent surfaces, a first surface connected to the frame and the second surface associated with the vertical pivot, the vertical pivot having a rotational axis, said lock piece being substantially U-shaped and comprising a pin, said pin being movably connected to one of said first surface or said second surface, said lock piece having a first and second end each having an axis substantially parallel to one another, said pin having an axis, said axis of said pin being substantially parallel to the rotational axis of the vertical pivot, a hole, said hole being in the other of said first surface or said second surface, means to selectively engage said pin with said hole, a spring, said spring biasing said pin in said hole, said means to selectively position said pin out of engagement with said hole.

6. The lock piece of claim 5 characterized in that said pin is movably connected to the frame.

7. The lock piece of claim 6 characterized in that said means to selectively engage said pin with said hole includes releasing said pin from engagement with the frame.

8. The lock piece of claim 6 characterized in that said means to selectively engage said pin with said hole includes passing said pin through a hole in the frame.

9. The lock piece of claim 6 characterized in that said pin is biased downward in respect to the frame by said spring.

10. A lawn care appliance, comprising:

a frame supported by two sets of wheels, a front set and a rear set, the rear set being fixed to the frame and front set being connected to the frame by a vertical pivot;

an arm secured to the frame, said vertical pivot attached to said frame by said arm, said arm having a first hole and a second hole, said first hole having a smaller diameter than said second hole;

a locking means, said locking means having a lock piece with a first and second end, and a pin, said second end positioned in said second hole of said arm to lock one of said front wheels to said frame by engaging said first end with said vertical pivot said pin being movably connected to one of said first surface or said second surface, a hole, said hole being in the other of said first surface or said second surface, and said locking mean including means to selectively engage said pin with said hole.

11. The lawn care appliance of claim 10 wherein said lock piece is substantially U-shaped.

12. The lawn care appliance of claim 10 wherein said first end of said lock piece has a nubbin, said nubbin extending through said second hole of said arm.

* * * * *

UNITED STATES PATENT AND TRADEMARK OFFICE
CERTIFICATE OF CORRECTION

PATENT NO. : 5,819,514
DATED : October 13, 1998
INVENTOR(S) : Usman Firdaus

It is certified that error appears in the above-identified patent and that said Letters Patent is hereby corrected as shown below:

Column 5,
Line 15, between "second" and "having", insert -- end --.
Line 18, between "locking" and "further, insert -- means --.

Column 6,
Line 8, delete "hole, said" and substitute -- hole, and --.
Line 34, between "pivot" and "said", insert -- , --.
Line 35, delete "said first" and substitute -- a first --.
Line 35, delete "said second" and substitute -- a second --.

In Figure 1, delete reference character "44" and substitute "45".

Signed and Sealed this

Thirty-first Day of August, 2004

JON W. DUDAS
*Director of the United States Patent and Trademark Office*